Aug. 26, 1969   W. E. BUCK   3,463,582
SHUTTER MECHANISM FOR HIGH SPEED CINECAMERA
Filed Dec. 23, 1966   3 Sheets-Sheet 1
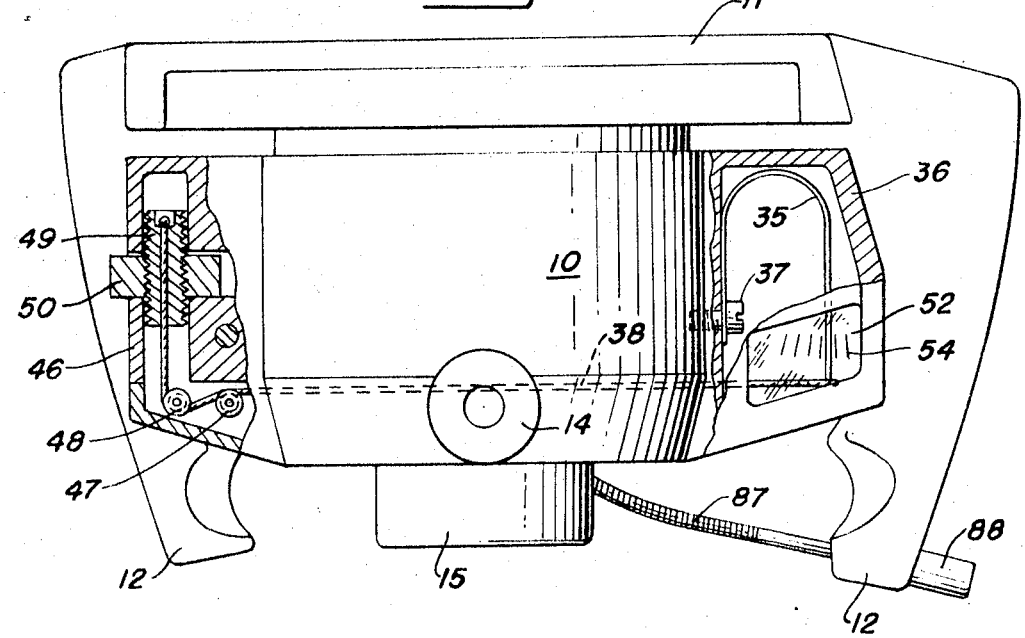
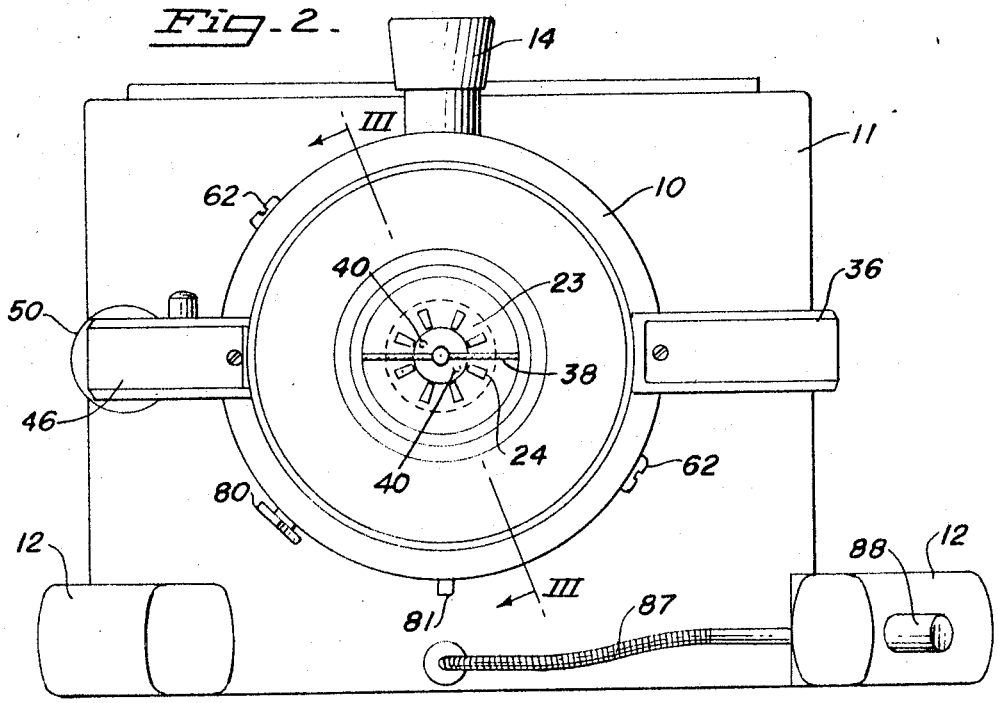
INVENTOR
WILLARD E. BUCK
BY
ATTORNEYS

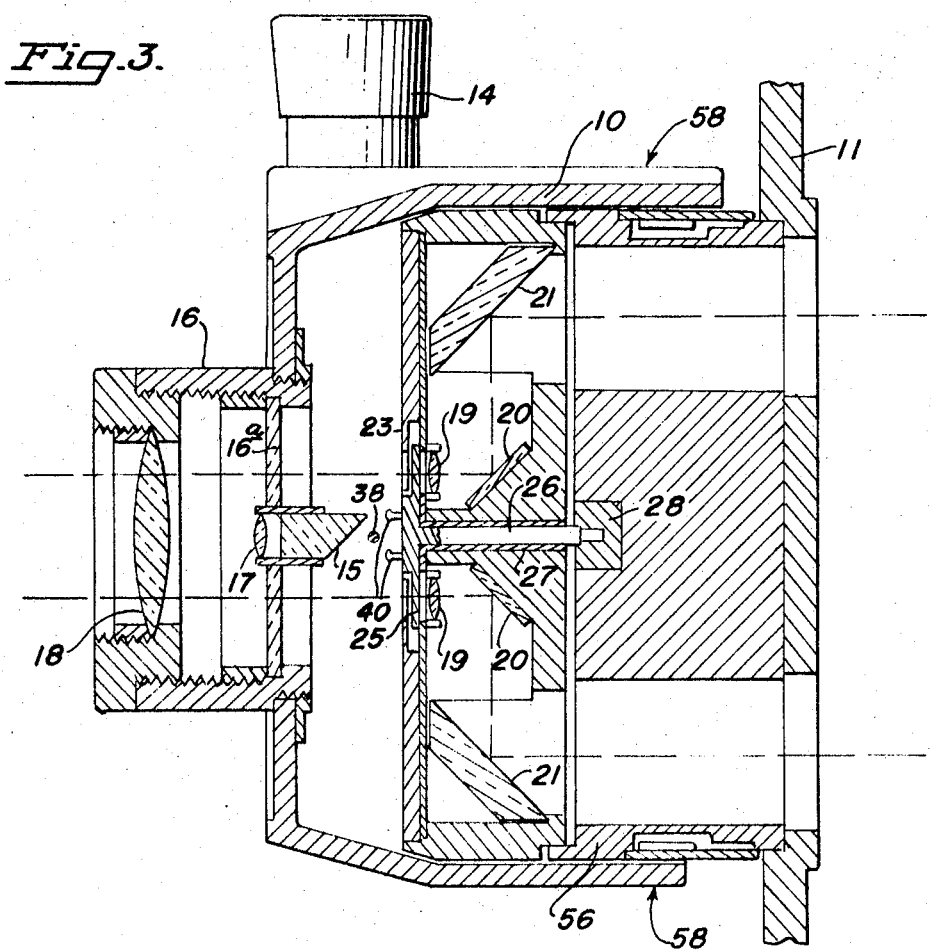

Aug. 26, 1969    W. E. BUCK    3,463,582
SHUTTER MECHANISM FOR HIGH SPEED CINECAMERA
Filed Dec. 23, 1966    3 Sheets-Sheet 3
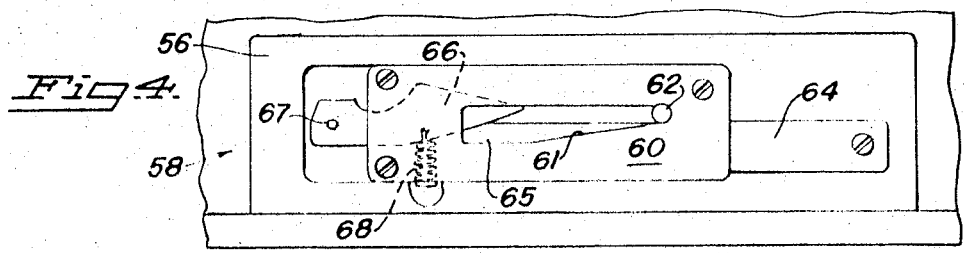
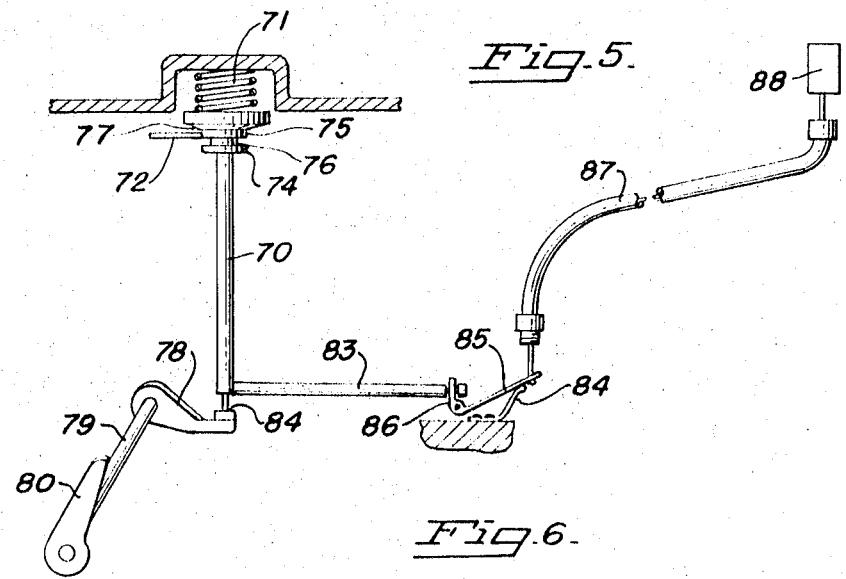
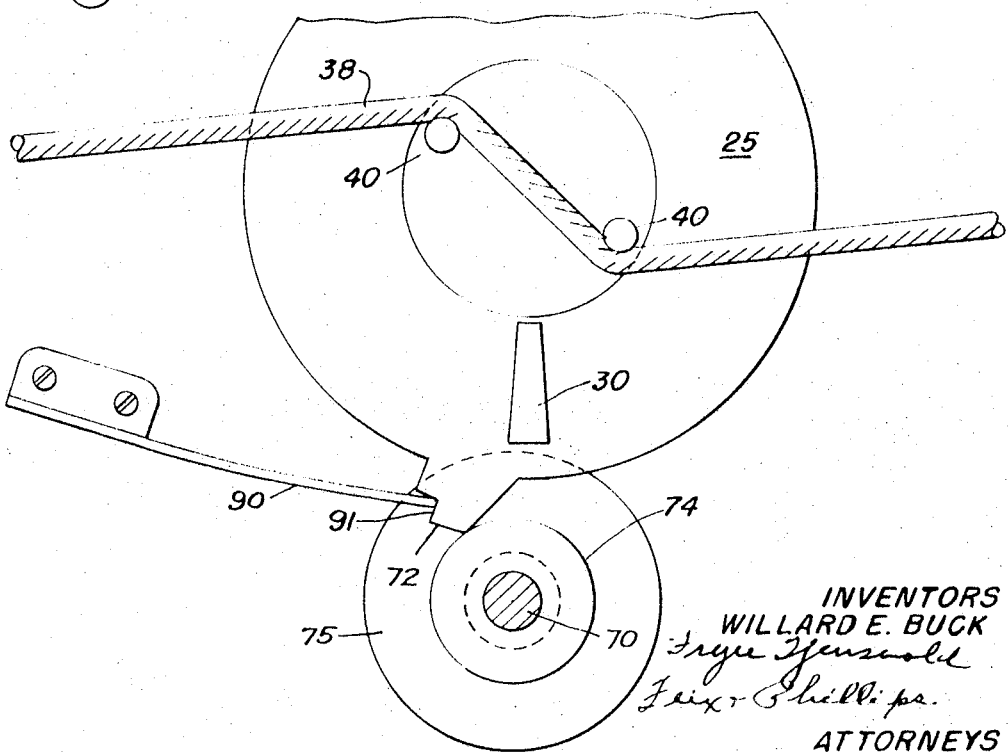
INVENTORS
WILLARD E. BUCK
ATTORNEYS United States Patent Office 3,463,582
Patented Aug. 26, 1969

3,463,582
SHUTTER MECHANISM FOR HIGH SPEED
CINECAMERA
Willard E. Buck, Los Gatos, Calif., assignor to Technical
Operations, Incorporated, Burlington, Mass., a corporation of Delaware
Filed Dec. 23, 1966, Ser. No. 604,216
Int. Cl. G03b *9/08, 41/00*
U.S. Cl. 352—205                                      7 Claims

ABSTRACT OF THE DISCLOSURE

A shutter mechanism for a high speed camera has a stator having eight apertures which are aligned with eight lenses. A rotor is mounted such that upon rotation a single aperture in the rotor registers consecutively with the apertures in the stator. Two spaced pins project axially from the rotor. A cord passes between the two pins and is fastened to a spring at one end and anchored to the housing at the other end. Upon rotation of the housing with respect to the shutter, the cord engages the pins and is deformed so that the spring is elongated. When the shutter is released the tension in the cord causes it to rotate.

BACKGROUND OF THE INVENTION

The invention is in the art of shuttering high speed cameras and particularly to a rotary type of shutter which is simple and inexpensive to construct and operate.

The optical arrangement in cameras of the type with which the present invention is used is generally known and a typical such arrangement is disclosed, for example in the U.S. patent to Courtney-Pratt No. 2,992,591. Shuttering means for such cameras have included complex systems of rotary masks or discs and costly drive means such as turbines and electric motors have been employed. One problem has been to admit light in very rapid succession to a plurality of lenses arranged in a circle and then abruptly discontinue the process to prevent double exposures. It is an object of the present invention to provide a very simple shuttering means which is fast and dependable.

In the drawings to which reference is made in the following specification:

FIG. 1 is a plan view with parts broken away and parts in section of a camera embodying the present invention;

FIG. 2 is a view in front elevation of the same camera;

FIG. 3 is a sectional view taken on the line III—III of FIG. 2; and

FIGS. 4, 5 and 6 are enlarged fragmentary details of parts of the shutter drive and control mechanism.

The camera with which the present invention is used is of a known type in which light from an event to be recorded enters through an objective system at spaced intervals and is then reflected radially outwardly and then axialy toward a film plane to make plurality of framed exposures arranged in a circular pattern on film at the plane. As shown in FIGS. 1 and 2 the camera comprises a generally annular housing 10 containing the optical components and a rectangular housing 11 disposed behind the housing 10 for containing a film pack in a well known manner. A pair of hand grips 12 extend forwardly from the film housing 11 so that the camera may be supported between the two hands of the photographer in a position where he may look downwardly into a view finder, the lens of which is contained within a small housing 14 disposed on top of the housing 10. The view finder is aligned with a reflecting prism 15 which, as shown in FIG. 3, is positioned to receive light through the objective aperture housing shown at 16. The prism 15 is supported on a flat glass plate 16a which also supports a lens 17 for the view finder.

The camera objective system is of the compound lens type comprising a large lens element 18 and a plurality of small lens components shown at 19 in FIG. 3. Light from the event to be recorded enters through the lens 18 and through the lenses 19 one at a time and in succession as controlled by the shutter of the present invention. In the camera herein disclosed there are eight lenses 19 arranged in a circular pattern and eight mirrors 20 to receive light from the lenses and reflect it radially outwardly to eight mirrors 21 for directing light toward the film plane in the housing 11, a part of which is shown in FIG. 3.

The compound lens system including the large lens element and any one of the small components is required for short range work when the camera is close to the event to be recorded. When so used the single large element serves as one component of the compound lens system for all of the eight small components. The large lens is removed for long range photography.

The shutter of the present invention comprises a stator and a rotor. The stator is in the form of a plate 23 disposed in front of the lenses 19 (see FIGS. 2 and 3) and having eight slits or apertures 24 disposed one in front of each of the objective components 19. The rotor is in the form of a disc 25 supported by a journal 26 in a bearing 27 and having an end extending into a thrust bearing 28. This disc 25 shown in enlargement in FIG. 6 has a single slot 30 therein (see FIG. 6) normally not aligned with any of the slots 24 in the stator but adapted upon rotation of the disc through one complete revolution to register in rapid succession with each of the eight apertures 24 and therefore admit light from the objective system to the film where it is focused to produce eight successive exposures thereon of the event being recorded.

The necessary rapid rotation of the disc 25 to effect the shuttering referred to is accomplished with a spring activating device which, as shown in FIG. 1 and 2, comprises a spring 35 contained in a small housing 36 on one side of the housing 10. This spring is anchored to the housing by a screw 37 and is provided with a return bend providing a resiliently movable end to which a cord 38 is secured. The cord 38 may also be seen in FIG. 2 as passing behind the objective lens and in front of two pins 40 which project forwardly from the shuttering disc 25 (also see FIG. 3). The opposite end of the cord is anchored in a housing 46 similar to the housing 36 and on the opposite side of the main housing where it is trained over guide rollers 47 and 48 and then secured in a threaded anchor 49 which is used to adjust the tension on the spring 35. A nut is threaded on the anchor 49 and projects through a slot in the housing 46 so that rotation of the nut adjusts the position of the anchor and the tension on the spring 35. A window 52 in the upper part of the housing 36 enables the operator of the camera to observe the spring 35 and determine the amount of tension from the position of the spring as viewed in relationship to a scale 54 on the window.

In order to turn the shutter disc 25 through a single rotation to permit light to pass in rapid succession through the several apertures in the stator 23, the cord 38 under tension is engaged between the two pins 40 while they are out of alignment as shown in FIG. 6 and the disc which is being held against rotation in this position is then released and under the energy stored in the spring 35 and transmitted through the cord 38 is rotated until it is brought to a stop after a single rotation. The mechanism for cocking the disc and spring mechanism and triggering means is shown in detail in FIGS. 4, 5 and 6. In the normal position of the parts before cocking takes place, the camera housing 10 which, as shown in FIG. 3, is rotatable upon an inner housing 56 is disposed slightly forwardly of the rectangular housing 11 and the taut cord 38 is disposed forwardly of the pins 40. In order to bring the parts into the position shown, the housing 10 is turned through an arc of approximately 45° and moved rearwardly until the cord 38 enters between the pins 40 and is then rotated back to its initial position with the cord engaged between the pins as it is simultaneously moved forwardly to the position of FIG. 3. This cocking device comprises two sets of springs and cams positioned as generally indicated at 58 in FIG. 3 between the inner housing 56 and the housing 10. The details of these assemblies are illustrated in FIG. 4. In this view, a suitable recess in the housing 56 is shown as covered by a cam plate 60 having an opening with a cam edge 61 into which projects a pin 62 there being two such pins extending through the outer housing 10 in the positions illustrated in FIG. 2. Upon partial rotation of the housing 10, which is accomplished by grasping the small housings 36 and 46, leftwardly as viewed in FIG. 4, the pin 62 moves from the right toward the left of the opening on top of a leaf spring shown at 64. It enters beneath a latch 66 which is pivoted at 67 and urged downwardly by a tension spring 68. The pin 62 cams the latch 66 upwardly as it rides off of the end of the leaf spring 64. The spring 68 of the latch 66 urges the pins rearwardly into the space at the end of the spring 64. This also moves the housing 10 rearwardly and positions the cord 38 between the pins 40.

Now upon rotation of the housing 10 back to its original position, the pins 62 ride up the beveled ends 65 of the leaf springs 64 temporarily pushing them out of the way. Engagement of the pins with the cam surfaces 61 moves the housing forwardly to the original position as shown in FIG. 3. At this time, the cord 38 is engaged between the pins 40 where it is held against moving forwardly to the FIG. 3 position by small grooves in the pins as shown in FIG. 5.

With the shuttering mechanism cocked in the manner described, triggering means is employed to release it and, in order to prevent double exposures, the shuttering disc 25 must be stopped at the end of one rotation and also prevent it from rebounding. The means for accomplishing these functions is shown in FIGS. 5 and 6. In these figures, a spindle 70 is shown as urged downwardly as viewed in FIG. 5 by a spring 71. This spindle cooperates with a projection 72 on the shuttering disc 25 and has a head which, as shown in FIG. 5, has annular surfaces comprising a sear surface 74, a stop surface 75 and an inclined brake surface 77 is disposed contiguous to the stop surface 75. In FIG. 5, the projection 72 of the disc is illustrated as resting against the stop surface 75 which is its position before cocking of the shutter.

When the shutter is cocked, spindle 70 is moved against the force of spring 71 until the projection 72 rests on the sear surface 74 which is the position illustrated in FIG. 6 and from which position it may be triggered to permit the shuttering disc to rotate. This movement is imparted to the spindle by a lever 78 on the shaft 79 which also carries a lever 80 disposed in a position to be engaged by a pin 81 (see FIG. 2) carried by the housing 10. When the housing is rotated during the first part of the cocking movement, the pin 81 engages the lever 80 to swing it counterclockwise as viewed in FIG. 5 and raise the spindle 70 to a position where the projection 72 rests on the sear 74. The spindle is held in this position by engagement of a latch pin 83 in a notch 84 of the spindle. The latch pin is urged to this position by a spring 84 swinging a lever 85 about its pivotal support 86. The shutter is triggered by moving the lever 85 to withdraw the latch pin 83. This is accomplished by a conventional flexible cable mechanism shown at 87 as having an actuating button 88. As shown in FIGS. 1 and 2, the button 88 is conveniently located on one of the hand grips 12. When the latch pin 83 is retracted, the spring 71 moves the spindle first to permit the projection 72 to pass through the release groove 76. As soon as the projection has cleared the groove, the spindle continues to move until it is in a position for the inclined brake surface 77 to intercept the projection 72 as the shutter approaches the completion of a full revolution. A slight braking effect is caused by the pressure of the spring 71 and the projection comes to rest on the stop surface 75 where it remains until the shuttering mechanism is again cocked. Just before the projection 72 comes to rest on the stop surface 75, it engages the spring shown at 90 in FIG. 6 flexing the spring downwardly as it passes and the spring instantly moves upwardly into a notch 91 in the back of the projection where it serves to prevent rebound or reverse rotation of the rotor disc 25 which rotation could result in a double exposure.

I claim:
1. Shutter mechanism for a camera with has a plurality of objective lenses arranged in a circular pattern and means for directing a focused beam from each lens to spaced areas on a film plane comprising a stator disc with an aperture for each lens, and a rotor disc with a single aperture arranged to register with the apertures in the stator successively upon rotation, said mechanism having a spring for storing energy for rotating the rotor, and having a taut cord between the spring and an anchor, said mechanism further including means on the rotor engageable with the cord to store energy in the spring with the cord taut, means to latch the rotor, and means to release the latch and permit rotation thereof.

2. The combination of claim 1 with means to stop the rotor after a single complete revolution which admits light to each of the plurality of objective lenses.

3. The combination of claim 2 with brake means effective to reduce the speed of the rotor only after shuttering of all of the lenses has taken place.

4. The combination of claim 1 in which the means on the rotor comprises two pins spaced from opposite sides of its center and projecting axially, means to move the cord to a position between the pins, and means to impart relative rotation between the cord and rotor to effectively shorten the cord and load the spring.

5. The combination of claim 4 in which the rotor is supported on a first camera housing part, a second camera housing part rotatable on the first and moveable axially on the first, the spring and taut cord being mounted on the second part with the spring passing in front of the rotor and means to move the second part axially toward the first and to rotate it to place the spring in a taut position between said pins.

6. The combination of claim 1 wherein the anchor for the spring is adjustable to vary the level of energy stored in the spring and thereby vary the shuttering speed of the rotor.

7. The combination of claim 6 in which the spring is disposed within the camera housing, a window near the spring, and a scale on the window to enable observation of the level of energy stored therein.

References Cited

UNITED STATES PATENTS

| | | | |
|---|---|---|---|
| 1,454,899 | 5/1923 | Legg | 352—84 |
| 2,992,591 | 7/1961 | Courtney-Pratt | 352—84 |
| 3,166,756 | 1/1965 | Hampl | 352—166 X |

NORTON ANSHER, Primary Examiner

M. H. HAYES, Assistant Examiner

U.S. Cl. X.R.

352—84